United States Patent
Sasaki et al.

(10) Patent No.: US 9,229,143 B2
(45) Date of Patent: Jan. 5, 2016

(54) INORGANIC POLARIZING PLATE CONTAINING FESI FINE PARTICLES

(71) Applicant: DEXERIALS CORPORATION, Tokyo (JP)

(72) Inventors: Koji Sasaki, Miyagi (JP); Akio Takada, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 171 days.

(21) Appl. No.: 13/767,426

(22) Filed: Feb. 14, 2013

(65) Prior Publication Data

US 2013/0215507 A1    Aug. 22, 2013

(30) Foreign Application Priority Data

Feb. 16, 2012 (JP) .................. 2012-032054

(51) Int. Cl.
   *G02B 5/30*       (2006.01)
(52) U.S. Cl.
   CPC .................. *G02B 5/3058* (2013.01)
(58) Field of Classification Search
   CPC .................................. G02B 5/3058
   See application file for complete search history.

(56) References Cited

U.S. PATENT DOCUMENTS

| | | | | |
|---|---|---|---|---|
| 2004/0125449 A1* | 7/2004 | Sales | ............................. | 359/486 |
| 2004/0201889 A1* | 10/2004 | Wang et al. | .................. | 359/486 |
| 2008/0186576 A1* | 8/2008 | Takada | ......................... | 359/492 |
| 2011/0170186 A1* | 7/2011 | Sawaki | .................... | 359/485.01 |
| 2011/0170187 A1* | 7/2011 | Sawaki | .................... | 359/485.03 |

FOREIGN PATENT DOCUMENTS

JP      B2-4488033      4/2010

* cited by examiner

*Primary Examiner* — Stephone B Allen
*Assistant Examiner* — Ryan Dunning
(74) *Attorney, Agent, or Firm* — Oliff PLC (57) ABSTRACT

To provide an inorganic polarizing plate which, when used in structures having different used wavelength bands, can reduce reflectance by using a common structure, making it possible to achieve a predetermined light extinction ratio. The inorganic polarizing plate has a substrate that is transparent to light in a used bandwidth, a reflective layer that is composed of grids that are formed on one surface of the substrate with a pitch that is smaller than a wavelength of light in the used bandwidth, a dielectric layer that is stacked on the reflective layer, and an absorbing layer containing FeSi fine particles.

6 Claims, 11 Drawing Sheets

REFLECTANCE Bch (MEASURED WAVELENGTH: 430 to 510 nm)

|  | Si | Fe(1%)Si | Fe(5%)Si | Fe(33%)Si |
|---|---|---|---|---|
| Rp[%] | 2.3 | 3.4 | 2.8 | 2.7 |
| Rs[%] | 3.7 | 3.6 | 1.6 | 1.6 |
| R-AVE[%] | 3.0 | 3.5 | 2.2 | 2.2 |

Si HIGH TEMPERATURE-HIGH MOISTURE 500h AMOUND OF CHANGE
MEASURED WAVELENGTH: 430 to 510 nm

|   | TRANSMITTANCE[%] | | CR | REFLECTANCE[%] | |
|---|---|---|---|---|---|
|   | TRANSMISSION AXIS | ABSORPTION AXIS |   | TRANSMISSION AXIS | ABSORPTION AXIS |
| 1 | -0.5 | 0.0 | -4.2% | 0.1 | -3.3 |
| 2 | -1.3 | 0.0 | -8.8% | 0.9 | -4.1 |
| 3 | -0.6 | 0.0 | -4.4% | 0.1 | -3.2 |
| 4 | -0.5 | 0.0 | -6.0% | 0.1 | -3.6 |
| 5 | -0.6 | 0.0 | -8.0% | 0.5 | -3.7 |
| 6 | -0.5 | 0.0 | -4.5% | 0.4 | -4.1 |

FIG.10

Fe(33%)Si HIGH TEMPERATURE-HIGH MOISTURE 500h AMOUND OF CHANGE
MEASURED WAVELENGTH: 430 to 510 nm

|   | TRANSMITTANCE[%] | | CR | REFLECTANCE[%] | |
|---|---|---|---|---|---|
|   | TRANSMISSION AXIS | ABSORPTION AXIS |   | TRANSMISSION AXIS | ABSORPTION AXIS |
| 1 | 0.0 | 0.0 | -11.9% | 0.3 | -0.3 |
| 2 | -0.1 | 0.0 | -10.7% | 0.2 | -0.4 |
| 3 | -0.1 | 0.0 | -11.6% | 0.2 | -0.4 |

| | BLUE 430-510nm | | | | GREEN 520-590nm | | | | RED 600-680nm | | | |
|---|---|---|---|---|---|---|---|---|---|---|---|---|
| | TRANSMITTANCE | | REFLECTANCE | | TRANSMITTANCE | | REFLECTANCE | | TRANSMITTANCE | | REFLECTANCE | |
| | TRANSM-ISSION AXIS (Tp) | ABSORP-TION AXIS (Ts) | TRANSM-ISSION AXIS (Rp) | ABSORP-TION AXIS (Rs) | TRANSM-ISSION AXIS (Tp) | ABSORP-TION AXIS (Ts) | TRANSM-ISSION AXIS (Rp) | ABSORP-TION AXIS (Rs) | TRANSM-ISSION AXIS (Tp) | ABSORP-TION AXIS (Ts) | TRANSM-ISSION AXIS (Rp) | ABSORP-TION AXIS (Rs) |
| Si | 65.8 | 81.2 | 18.1 | 12.3 | 78.1 | 86.8 | 14.4 | 10.7 | 84.7 | 89.3 | 12.1 | 9.8 |
| Fe(1%)Si | 66.0 | 80.0 | 17.2 | 12.4 | 76.8 | 85.5 | 14.1 | 10.9 | 83.0 | 88.2 | 12.1 | 10.0 |
| Fe(5%)Si | 66.2 | 79.4 | 15.7 | 12.0 | 74.3 | 83.9 | 13.4 | 10.8 | 79.3 | 86.4 | 12.0 | 10.0 |

FIG.16

INORGANIC POLARIZING PLATE CONTAINING FESI FINE PARTICLES

BACKGROUND OF THE INVENTION

1. Field of the Invention

The present invention relates to a polarizing element, and in particular concerns an inorganic polarizing plate that is superior in durability with a superior transmitting characteristic over a wide range of wavelengths of light.

2. Description of the Related Art

It is indispensably required for a transmission type liquid crystal display apparatus to provide a polarizing plate on the surface of a liquid crystal panel from its image forming principle. The function of the polarizing plate is to absorb one of orthogonal polarized light components (so-called P-polarized light wave and S-polarized light wave) and also to transmit the other component. As the polarizing plate of this type, a dichroic polarizing plate formed by allowing a conventional film to contain an iodine-based polymeric organic substance and a dye-based polymeric organic substance has been widely used.

In recent years, the liquid crystal display apparatus has been expanded in its applications and has been highly functionalized. Accordingly, higher reliability and durability have been required for individual devices constituting the liquid crystal display apparatus. For example, in the case of a liquid crystal display apparatus using a light source with a large light quantum, such as, for example, a transmission-type liquid crystal projector, the polarizing plate is subjected to strong radiation. Therefore, the polarizing plate to be used therein needs to have superior heat resistance. However, since the above-mentioned film-based polarizing plate is an organic substance, it is inherently limited in increasing these characteristics.

In view of these problems, as the inorganic polarizing plate having superior heat resistance, various kinds of inorganic polarizing plates, such as a polarizing plate formed by dispersing silver fine particles in glass in an island pattern, a polarizing plate in which silver fine particles are deposited in glass, a polarizing plate using aluminum fine particles, and the like, have been proposed.

Moreover, a wire grid-type polarizing plate has been proposed in which metal thin wires are formed on a substrate with a pitch smaller than a wavelength of light within the used bandwidth so that a polarized light component that is in parallel with the metal thin wires is reflected, with an orthogonal polarized light component being transmitted, so that a predetermined polarizing characteristic is obtained, or a wire grid-type polarizing element has been proposed in which a dielectric layer and an inorganic fine particle layer are formed on a metal lattice so as to have three layers in total so that by cancelling light reflected from the metal lattice by the use of interference effect, a wire grid that is in general a reflection type is used as an absorption type, has been proposed (Patent Document 1: U.S. Pat. No. 4,488,033).

By the way, in the inorganic polarizing plate in which inorganic fine particles or an inorganic fine particle layer is formed, since its extinction ratio differs depending on the materials for the inorganic fine particles, in the inorganic polarizing plate, it is necessary to take into consideration to select inorganic fine particles that can provide a desired extinction ratio and to appropriately set the film thickness thereof, in order to reduce and optimize the reflectance in accordance with the bandwidth of light to be used.

An object of the present invention is to provide an inorganic polarizing plate that can reduce a reflectance by using a common structure even in the case when the wavelength bandwidth to be used is different, and to achieve a desired extinction ratio.

SUMMARY OF THE INVENTION

In order to solve the above-mentioned problems, an inorganic polarizing plate relating to the present invention is provided with a substrate that is transparent to light within a used bandwidth, a reflective layer made of grids that are formed on one surface of the substrate with a pitch that is smaller than the wavelength of light within the used bandwidth, a dielectric layer stacked on the reflective layer and an absorbing layer containing FeSi fine particles, which is stacked on the dielectric layer.

In accordance with the inorganic polarizing plate of the present invention, in addition to providing a polarizing plate having a desired extinction ratio within a visible light range, it is also possible to reduce the reflectance within a wavelength bandwidth over a wider range. Therefore, even in the case when a wavelength bandwidth to be used is different, the inorganic polarizing plate of the present invention is applicable to such a structure, and even in the case when a wavelength bandwidth to be used is different, an inorganic polarizing plate can be manufactured under common conditions.

DETAILED DESCRIPTION OF THE PREFERRED EMBODIMENTS

Referring to Figs, the following description will discuss an inorganic polarizing plate to which the present invention is applied in detail. Additionally, the present invention is not intended to be limited only by the following embodiments, and it is needless to say that various modifications may be made therein within a scope without departing from the gist of the present invention.

Figure 1:
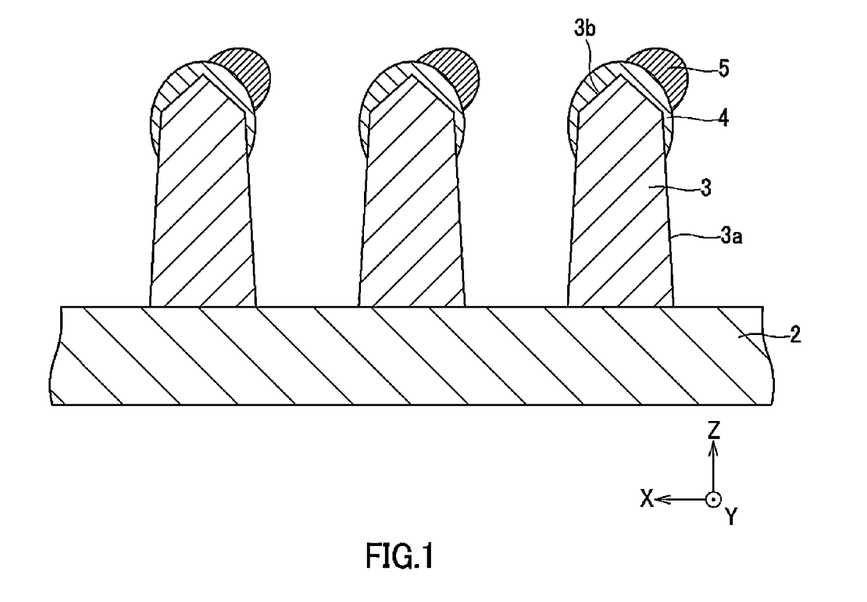
FIG. 1 is a cross-sectional view showing an inorganic polarizing plate to which the present invention is applied.

As shown in FIG. 1, an inorganic polarizing plate 1 to which the present invention is applied has a substrate 2 that is transparent to light within a used bandwidth, a reflective layer 3 made of grids formed on one surface of the substrate 2 with a pitch that is smaller than the wavelength of light within the used bandwidth, a dielectric layer 4 stacked on the reflective layer 3 and an absorbing layer 5 that is composed of FeSi fine particles. A polarizing element 1 is a resonance absorbing type inorganic polarizing element that exerts a predetermined polarizing characteristic by utilizing a difference in light absorbing rate caused by optical anisotropy in the in-plane axial direction of FeSi fine particles in an island pattern formed on the substrate 2.

The substrate 2 is composed of glass, a ceramic material or the like that is transparent to a used bandwidth, for example, a visible light bandwidth. In this case, by using a quartz or sapphire substrate having a high thermal conductivity as the constituent material for the substrate 2, a polarizing element for use in optical engine for a projector, which has a high heating value, is advantageously obtained.

The reflective layer 3 is formed on the surface of the substrate 2 with a predetermined lattice pattern. The reflective layer 3 forms a base layer for the dielectric layer 4 and the absorbing layer 5, and by the processed size of the reflective layer 3 and the pattern shape thereof, the optical characteristics of the polarizing element 1 that depend on the shape of the absorbing layer 5 are determined. The reflective layer 3 is formed into a lattice shape so as to impart a shape anisotropy to the absorbing layer 5 formed on the upper surface thereof.

The reflective layer 3 is composed of a plurality of convex portions that are continuously formed in one in-plane direction of the substrate 2 with a pitch that is smaller than a wavelength of light in the used bandwidth. The reflective layer 3 is provided with a base portion 3a formed into a virtually rectangular shape in its cross section by combining an isotropic etching process and an anisotropic etching process with each other, and convex portions 3b, each composed of the upper surface of the base portion 3a formed into a tapered shape. Thus, the reflective layer 3 has a structure in which the dielectric layer 4 and the absorbing layer 5 composed of FeSi are stacked on the upper surface of the convex portions 3b.

The dielectric layer 4 is formed with an optical material, such as $SiO_2$ or the like, that is transparent to visible light and film-formed by a sputtering method or a sol-gel method (for example, a method in which a sol that is coated by a spin coating method is further formed into a gel by a thermosetting process). The dielectric layer 4 is formed as a base layer for the absorbing layer 5. Moreover, it is formed for the purpose of enhancing an interference effect by adjusting the phase of polarized light that has transmitted through the absorbing layer 5 and reflected by the reflective layer 3, with respect to polarized light reflected by the absorbing layer 5.

As the material for forming the dielectric layer 4, in addition to $SiO_2$, generally-used materials, such as $Al_2O_3$, $MgF_2$ or the like, may be used. These materials can be coated onto the substrate 2 by a general-use vacuum film-forming process, such as a sputtering method, a vapor phase epitaxy method, a vapor deposition method or the like, or can be applied as a sol-state substance onto the substrate 2 and by thermosetting the substance thereon so as to form a thin film.

[Absorbing Layer]

Figure 2:
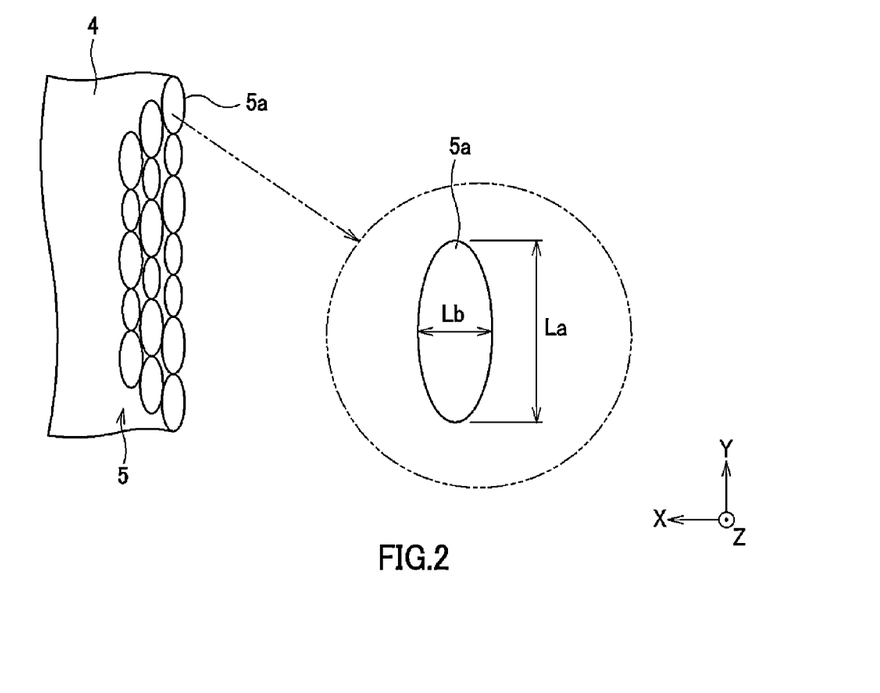
FIG. 2 is a plan view showing an absorbing layer of the inorganic polarizing plate.

The absorbing layer 5 is characterized by being composed of silicide-based semiconductor fine particles, in particular, FeSi fine particles 5a, formed on the top portions of the dielectric layer 4. As shown in FIG. 2, the FeSi fine particles 5a have such a shape anisotropy that the length La of each fine particle diameter in the length-wise direction (Y-axis direction) of the reflective layer 3 is longer than the length Lb of the fine particle diameter in the width-wise direction (X-axis direction) orthogonal to the length-wise direction (Y-axis direction) of the reflective layer 3.

Since such a shape anisotropy is exerted, optical constants can be made different between the Y-axis direction (length-wise direction) and the X-axis direction (width-wise direction). As a result, a predetermined polarizing characteristic in which polarized components in parallel with the length-wise direction are absorbed, while polarized components in parallel with the width-wise direction are transmitted, can be obtained. The absorbing layer 5 composed of the FeSi fine particles 5a having such a shape anisotropy can be formed by an oblique film formation, for example, by carrying out an oblique sputtering film-forming process, or the like.

Additionally, the above-mentioned absorbing layer 5 is formed by a single layer of the FeSi fine particles 5a; however, it is only necessary for the inorganic polarizing plate 1 of the present invention to include a layer of the FeSi fine particles 5a so that, for example, a plurality of layers of the FeSi fine particles 5a having different concentrations may be stacked, or the absorbing layer 5 may be formed by a layer of the FeSi fine particles 5a and a layer composed of fine particles of another silicide-based semiconductor.

Moreover, the absorbing layer 5 is formed by stacking the FeSi fine particles 5a only on one side of the convex portions 3b of the reflective layer 3; however, the inorganic polarizing plate 1 relating to the present invention may be formed by stacking the FeSi fine particles 5a from two sides of the convex portions 3b of the reflective layer 3.

[Protective Layer]

Figure 3:
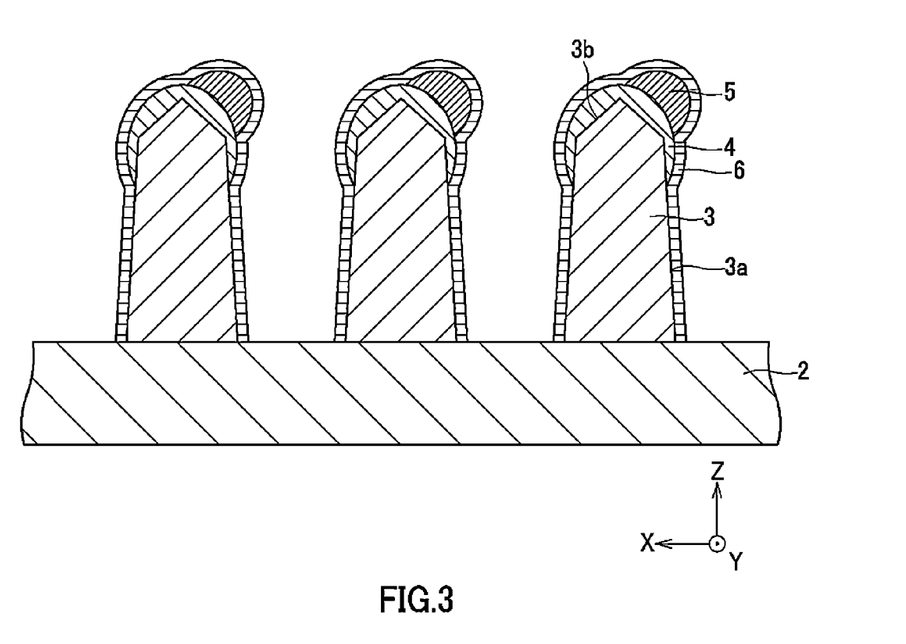
FIG. 3 is a cross-sectional view showing an inorganic polarizing plate on which a protective layer is formed.

As shown in FIG. 3, the inorganic polarizing plate 1 may have a structure in which the protective layer 6 is formed on the absorbing layer 5. The protective layer 6 may be formed by using a general-use material, such as $SiO_2$, $Al_2O_3$, $MgF_2$ or the like. These materials can be coated onto the substrate 2 by a general-use vacuum film-forming process, such as a sputtering method, a vapor phase epitaxy method, a vapor deposition method or the like, or can be applied as a sol-state substance onto the substrate 2 and by thermosetting the substance thereon so that a thin film is formed thereon.

[Manufacturing Process]

The following description will discuss a method of manufacturing the inorganic polarizing plate 1. FIG. 4 is a process drawing that shows the method for manufacturing an inorganic polarizing plate. The method for manufacturing the inorganic polarizing plate 1 of the present embodiment includes a reflective layer forming process in which a plurality of reflective layers 3, each having a stripe shape, which have a length-wise direction and a width-wise direction that are orthogonal to each other, are formed to be arranged on the substrate 2 along the width-wise direction with fixed intervals, a dielectric layer forming process in which the dielectric layer 4 is formed on the reflective layer 3, and an absorbing layer forming process in which the absorbing layer 5, composed of FeSi fine particles 5a having such a shape anisotropy that the length of each fine particle diameter in the length-wise direction of the reflective layer 3 is longer than the length of the fine particle diameter in the width-wise direction of the reflective layer 3, is formed on the dielectric layer 4, and the method further includes a protective layer forming process for forming a protective layer 6 on the absorbing layer 5, if necessary.

Figure 4A:
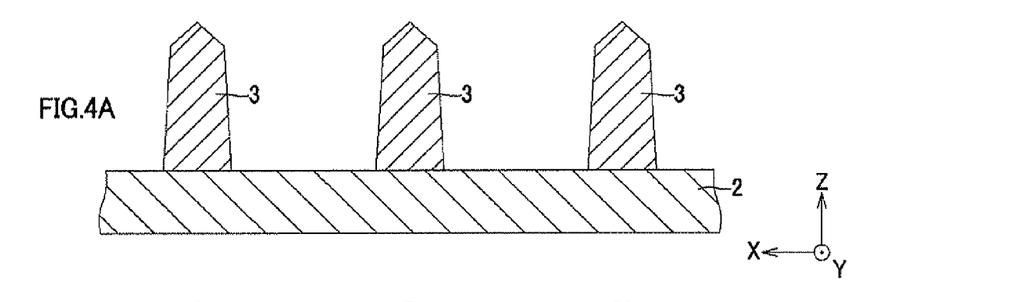
FIGS. 4A, 4B, 4C, and 4D are cross-sectional views showing production processes of the inorganic polarizing plate.

As shown in FIG. 4(a), in the reflective layer forming process, the reflective layer 3 is formed on the substrate 2. The reflective layer 3 is formed by, for example, a patterning process using a photolithography method. Moreover, the reflective layer 3 is formed such that by combining an isotropic etching process and an anisotropic etching process with each other, base portions 3a, each having a virtually rectangular shape in its cross section, and convex portions 3b each of which is made of the upper surface of each base portion 3a formed into a tapered shape are formed.

Figure 4B:
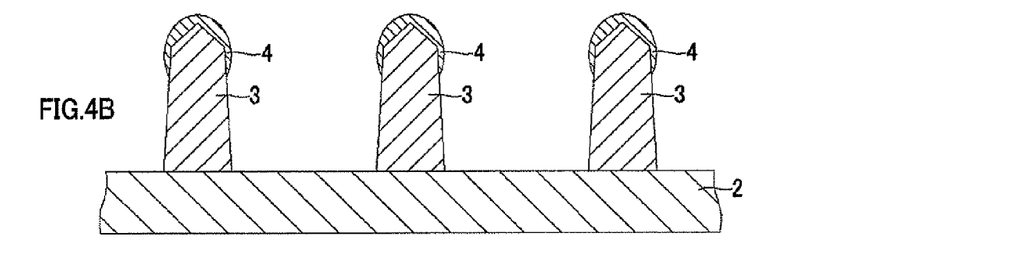

In the dielectric layer forming process, as shown in FIG. 4(b), the dielectric layer 4 made of $SiO_2$ or the like is formed on the reflective layer 3. The dielectric layer 4 is formed by using, for example, a sputtering method or a sol-gel method.

Figure 4C:
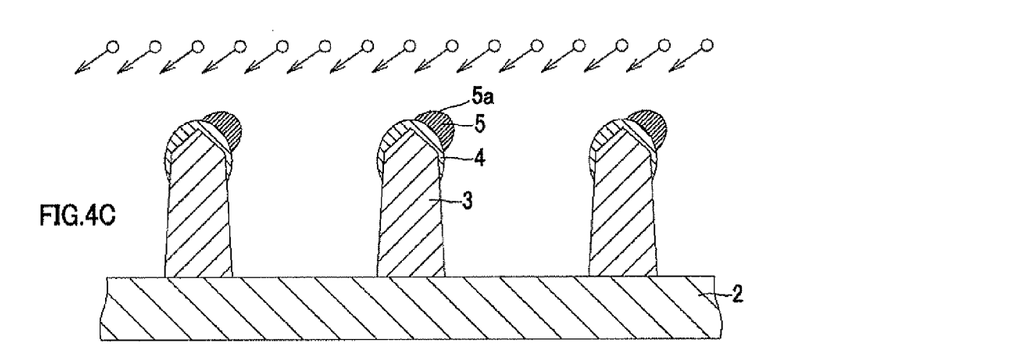
Figure 4D:
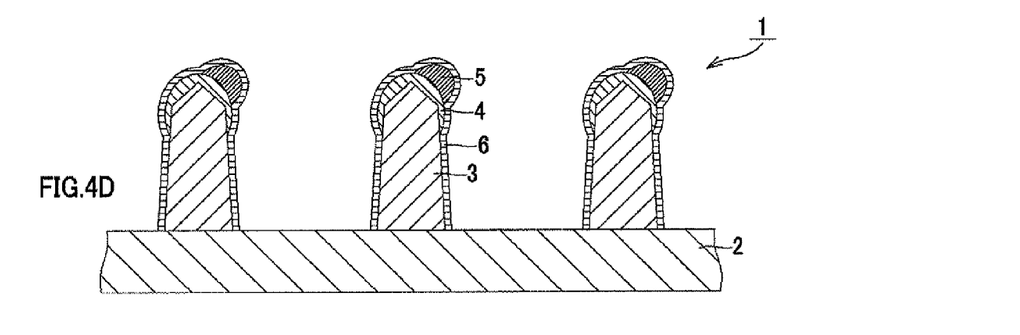

In the absorbing layer forming process, as shown in FIG. 4(c), of adjacent reflective layers 3, a layer of FeSi fine particles 5a is obliquely film-formed from one of the reflective layer 3 side so that the absorbing layer 5 having convex portions, each obliquely tilted toward the reflective layer 3, is formed on the one of the reflective layer 3 side. More specifically, for example, by using a sputtering device, sputtered particles are deposited in an oblique direction relative to the substrate 2 on which the reflective layers 3 are formed so that the absorbing layer 5 is formed. In FIG. 4(c), the incident direction of the sputtered particles is indicated by an arrow. The oblique angle of the obliquely formed film relative to the substrate 2 surface is set on demand within a range from about 0 to 50°. This arrow indicating the incident direction of the sputtered particles represents an incident direction in which the particles pass from the absorbing layer 5 toward the reflective layer 3.

Additionally, in the absorbing layer forming process, by the above-mentioned oblique film-forming process, the FeSi fine particles 5a having such a shape anisotropy that the length La of each fine particle diameter in the length-wise direction of the reflective layer 3 is longer than the length Lb of the fine particle diameter in the width-wise direction orthogonal to the length-wise direction of the reflective layer 3 are formed on the dielectric layer 4 (see FIG. 2).

Additionally, as shown in FIG. 3, in the protective layer forming process, the protective layer 6 is formed on the absorbing layer 5. The protective layer 6 is formed by, for example, a sputtering process of $SiO_2$ or the like. By carrying out the above-mentioned processes, the inorganic polarizing plate 1 can be manufactured.

Examples

The following description will discuss examples of the inorganic polarizing plate 1. In the present examples, as the composition ratio of the FeSi fine particles 5a forming the absorbing layer 5 of the inorganic polarizing plate 1, three kinds of samples having Fe of 33 mol % (example 1), Fe of 5 mol % (example 2) and Fe of 1 mol % (example 3) were prepared, and these were compared with an inorganic polarizing plate (comparative example 1) having an absorbing layer composed of Si fine particles. Additionally, the pitches of the reflective layers and the widths of the reflective layers, or the film thicknesses of the respective layers of the reflective layer, the dielectric layer and the absorbing layer, are designed on demand in accordance with an aimed polarizing characteristic (extinction ratio) and a visible light wavelength range to be used. In the present examples, the pitch of the reflective layers was 148 nm, the width of the reflective layer was 65 nm, the film thickness of the reflective layer was 200 nm, the film thickness of the dielectric layer was 15 nm, and the film thickness of the absorbing layer was 20 nm.

[Absorption Axis Reflectance Characteristic]

Figure 5:
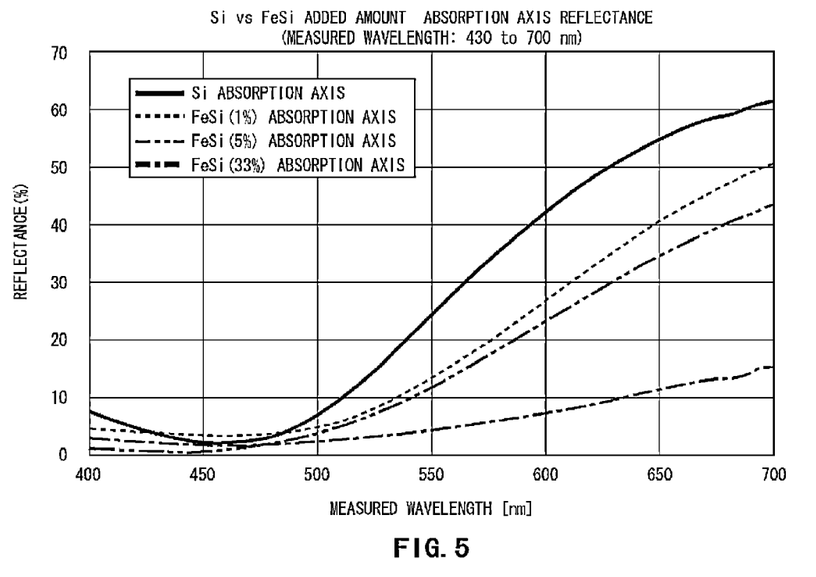
FIG. 5 is a graph that shows a wavelength dependent characteristic of an absorption axis reflectance of the inorganic polarizing plate in accordance with each of examples and comparative examples.

FIG. 5 shows an absorption axis reflectance of each of the inorganic polarizing plates relating to examples 1 to 3 and comparative example 1, relative to measured wavelengths of 400 to 700 nm. These inorganic polarizing plates are devices that are optimized for use in the blue bandwidth (430 to 510 nm). As shown in FIG. 5, in comparative example 1, it is possible to reduce the absorption axis reflectance locally within the aimed blue wavelength bandwidth. In contrast, in examples 1 to 3, since the absorbing layer made of inorganic fine particles formed by adding Fe to Si is prepared, it becomes possible to reduce the absorption axis reflectance over a wider range of the wavelength bandwidth. Moreover, by increasing the added amount of Fe, it is possible to reduce the absorption axis reflectance over by far a wider range of the wavelength bandwidth.

[Transmission Axis Reflectance Characteristic]

Figure 6:
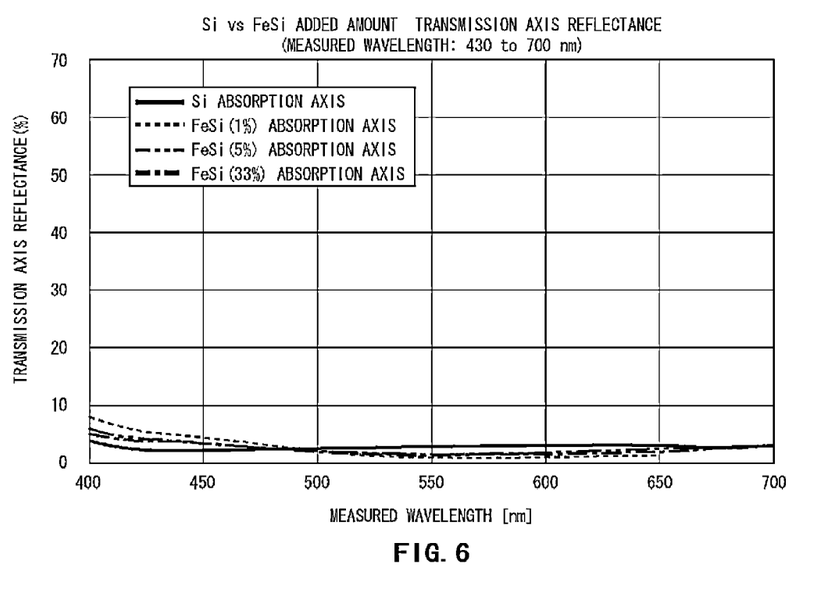
FIG. 6 is a graph that shows a wavelength dependent characteristic of a transmission axis reflectance of the inorganic polarizing plate in accordance with each of examples and comparative examples.

FIG. 6 shows a transmission axis reflectance of each of the inorganic polarizing plates relating to examples 1 to 3 and comparative example 1 with respect to measured wavelengths of 400 to 700 nm. With respect to the transmission axis reflectance, there is no great difference between examples 1 to 3 and comparative example 1.

[Transmission Axis Reflectance, Absorption Axis Reflectance, Average Reflectance]

Figure 7:
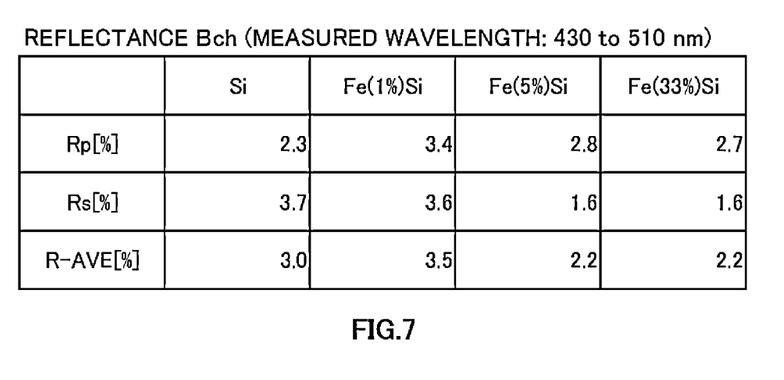
FIG. 7 is a table that shows a transmission axis reflectance (%), an absorption axis reflectance (%) and a reflectance average (%) of the inorganic polarizing plate in accordance with each of examples and comparative examples.

FIG. 7 shows a transmission axis reflectance (Rp), an absorption axis reflectance (Rs) and a reflectance average (R-AVE: (Rp+Rs)/2) in the blue bandwidth (430 to 510 nm) of each of examples 1 to 3 and comparative example 1. As the polarizing plate, it is preferable to set both of Rp and Rs to low values, and when R-AVE was examined, each of example 1 (Fe: 33 mol %) and example 2 (Fe: 5 mol %) had a reflectance lower than that of comparative example 1 (Si).

[Transmission Axis Reflectance/Absorption Axis Transmittance]

Figure 8:
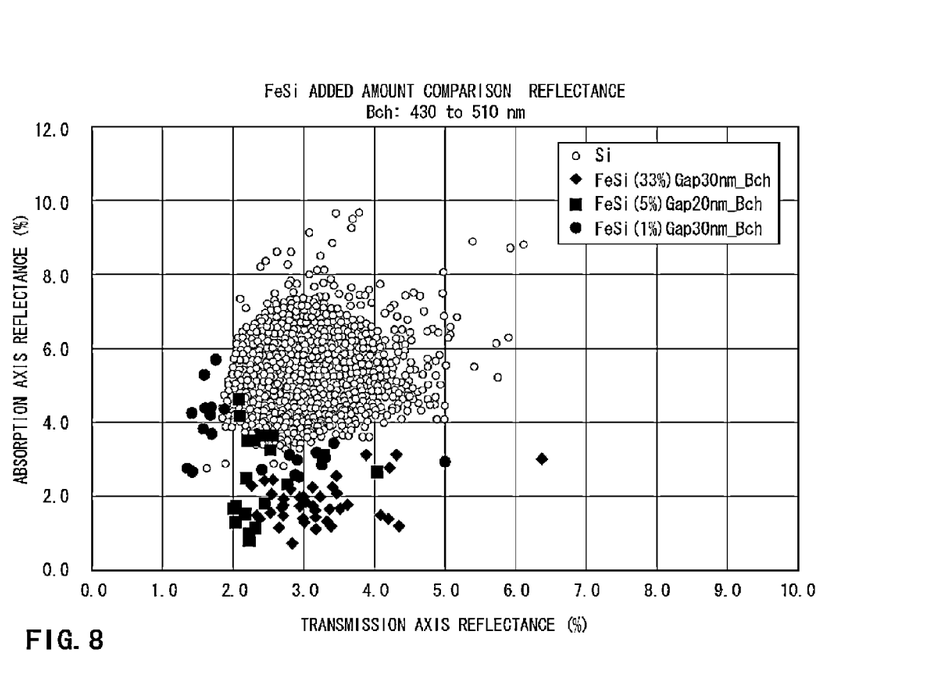
FIG. 8 is a graph that shows a transmission axis reflectance and an absorption axis reflectance within measured wavelengths from 400 to 510 nm of the inorganic polarizing plate in accordance with each of examples and comparative examples.

FIG. 8 shows a transmission axis reflectance and an absorption axis transmittance obtained when the measured wavelength is varied within a range from 400 to 510 nm with respect to the inorganic polarizing plate in accordance with each of examples 1 to 3 and comparative example 1. When the distribution shown in FIG. 8 is examined, it is found that the inorganic polarizing plate provided with an absorbing layer composed of FeSi fine particles can reduce the reflectance more effectively than the inorganic polarizing plate provided with an absorbing layer composed of only the Si fine particles.

[Transmittance/Contrast]

Figure 9:
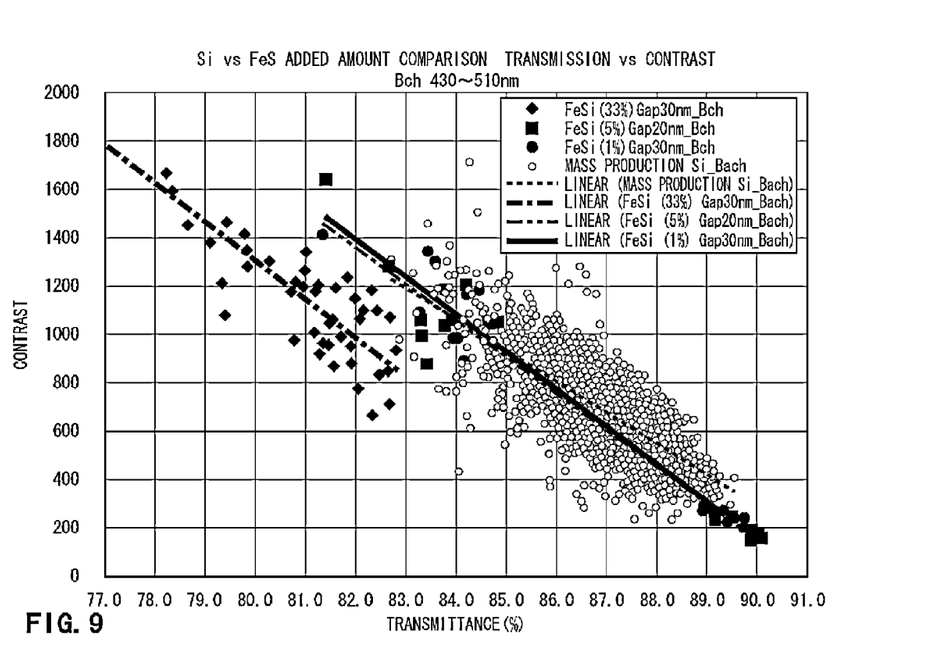
FIG. 9 is a graph that shows a transmittance and a contrast within measured wavelengths from 400 to 510 nm of the inorganic polarizing plate in accordance with each of examples and comparative examples.

FIG. 9 shows a transmittance and a contrast obtained when the measured wavelength is varied within a range from 400 to 510 nm with respect to the inorganic polarizing plate in accordance with each of examples 1 to 3 and comparative example 1. When the distribution shown in FIG. 9 is examined, it is found that example 2 (Fe: 5 mol %) and example 3 (Fe: 1 mol %) make is possible to provide the same polarizing characteristic as that of comparative example 1 (Si).

[Transmittance/Contrast/Reflectance]

Figure 10:
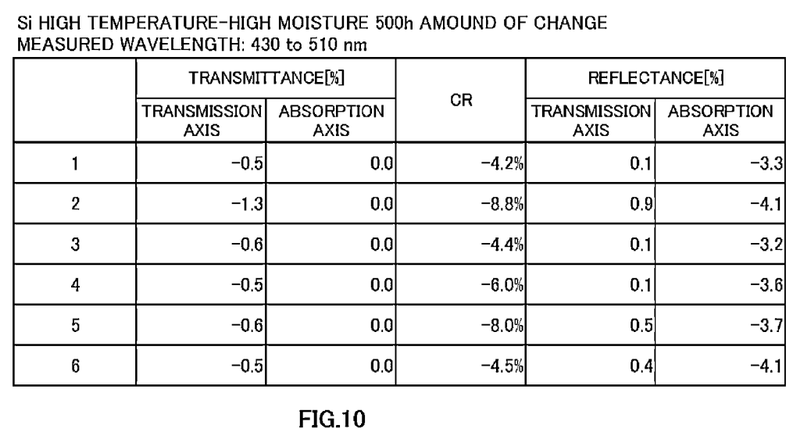
FIG. 10 is a table that shows a transmittance, contrast and reflectance obtained when a measured wavelength is varied in a range from 400 to 510 nm with respect to an inorganic polarizing plate relating to comparative example 1 after having been subjected to a high temperature-high moisture test (60° C., 90%, 500 hr).
Figure 11:
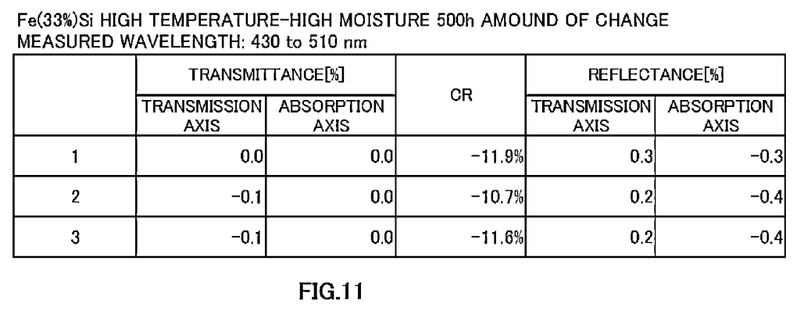
FIG. 11 is a table that shows a transmittance, contrast and reflectance obtained when a measured wavelength is varied in a range from 400 to 510 nm with respect to an inorganic polarizing plate relating to example 1 after having been subjected to a high temperature-high moisture test (60° C., 90%, 500 hr).

FIG. 10 shows a transmittance, contrast and reflectance obtained when a measured wavelength is varied in a range from 400 to 510 nm with respect to an inorganic polarizing plate relating to comparative example 1 after having been subjected to a high temperature-high moisture test (60° C., 90%, 500 hr). Moreover, FIG. 11 shows a transmittance, contrast and reflectance obtained when a measured wavelength is varied in a range from 400 to 510 nm with respect to an inorganic polarizing plate relating to example 1 after having been subjected to a high temperature-high moisture test (60° C., 90%, 500 hr). As indicated by FIGS. 10 and 11, even after having been subjected to the high temperature-high moisture test (60° C., 90%, 500 hr), example 1 has no significant difference from comparative example 1 over all the items.

The following description will discuss a reference example in which by comparing a sample on which a solid film of FeSi fine particles is formed on a quartz substrate by a sputtering film-forming process or the like with a sample on which a solid film of Si fine particles is formed thereon, respective transmittance and reflectance are measured. In this reference example, as the composition ratio of the FeSi fine particles 5a, two kinds of samples having Fe of 5 mol % (reference example 1) and Fe of 1 mol % (reference example 2) were prepared, and these were compared with a sample (reference example 3) composed of Si fine particles.

Figure 12:
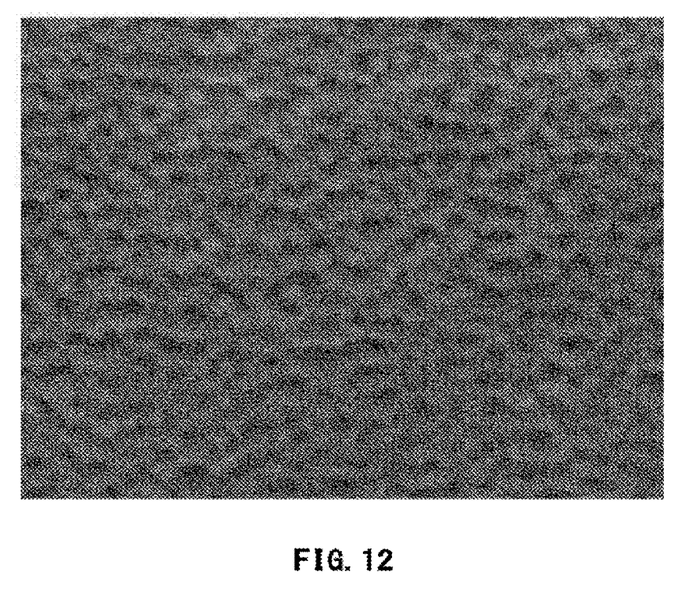
FIG. 12 shows an SEM image indicating a solid film composed of Fe(5%)Si fine particles.
Figure 13:
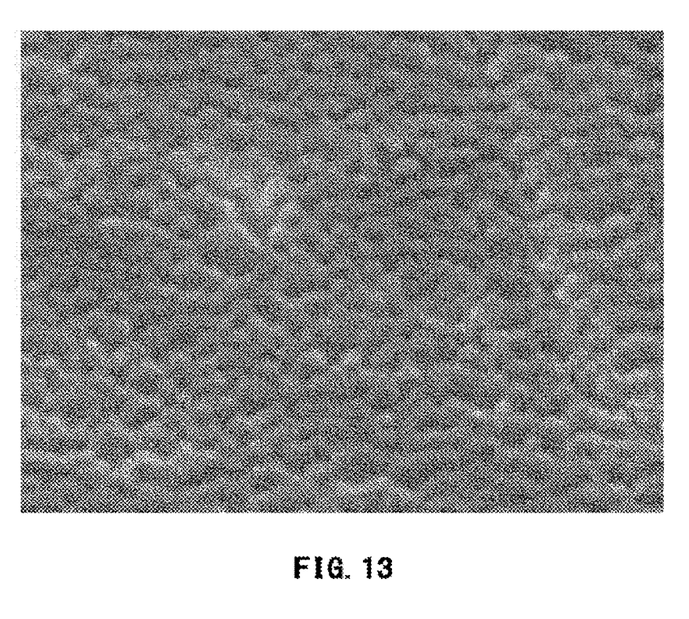
FIG. 13 shows an SEM image indicating a solid film composed of Fe(1%)Si fine particles.

FIG. 12 is an SEM image obtained by photographing the sample surface on which Fe (5%) Si fine particles have been film-formed on a quartz substrate relating to reference example 1. FIG. 13 is an SEM image obtained by photographing the sample surface on which Fe (1%) Si fine particles have been film-formed on a quartz substrate relating to reference example 2. As indicated by FIGS. 12 and 13, adhered states of the films defer from each other depending on the compositions of fine particles.

Figure 14:
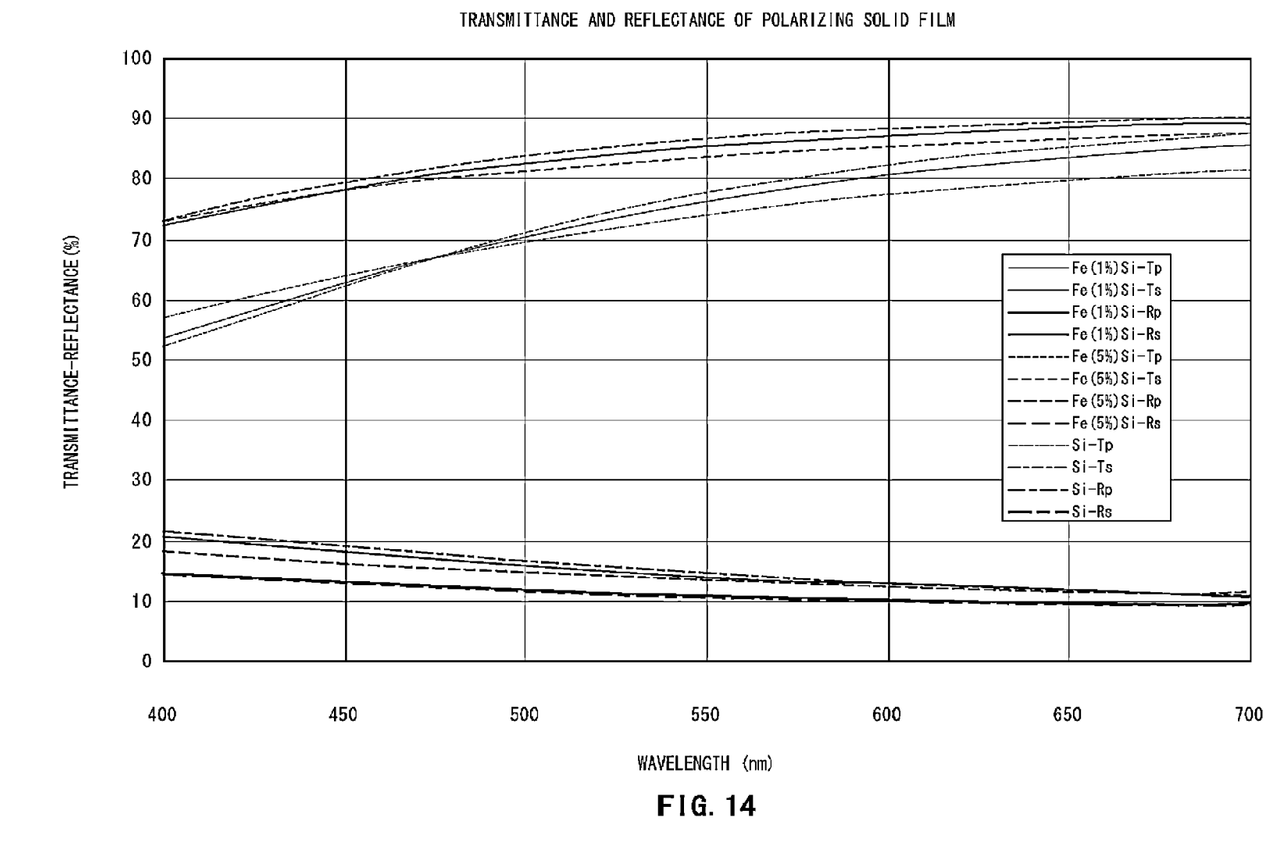
FIG. 14 is a graph showing the results of measurements of a reflectance and a transmittance within measured wavelengths of 400 to 700 nm carried out on samples relating to reference examples 1 to 3.
Figure 15:
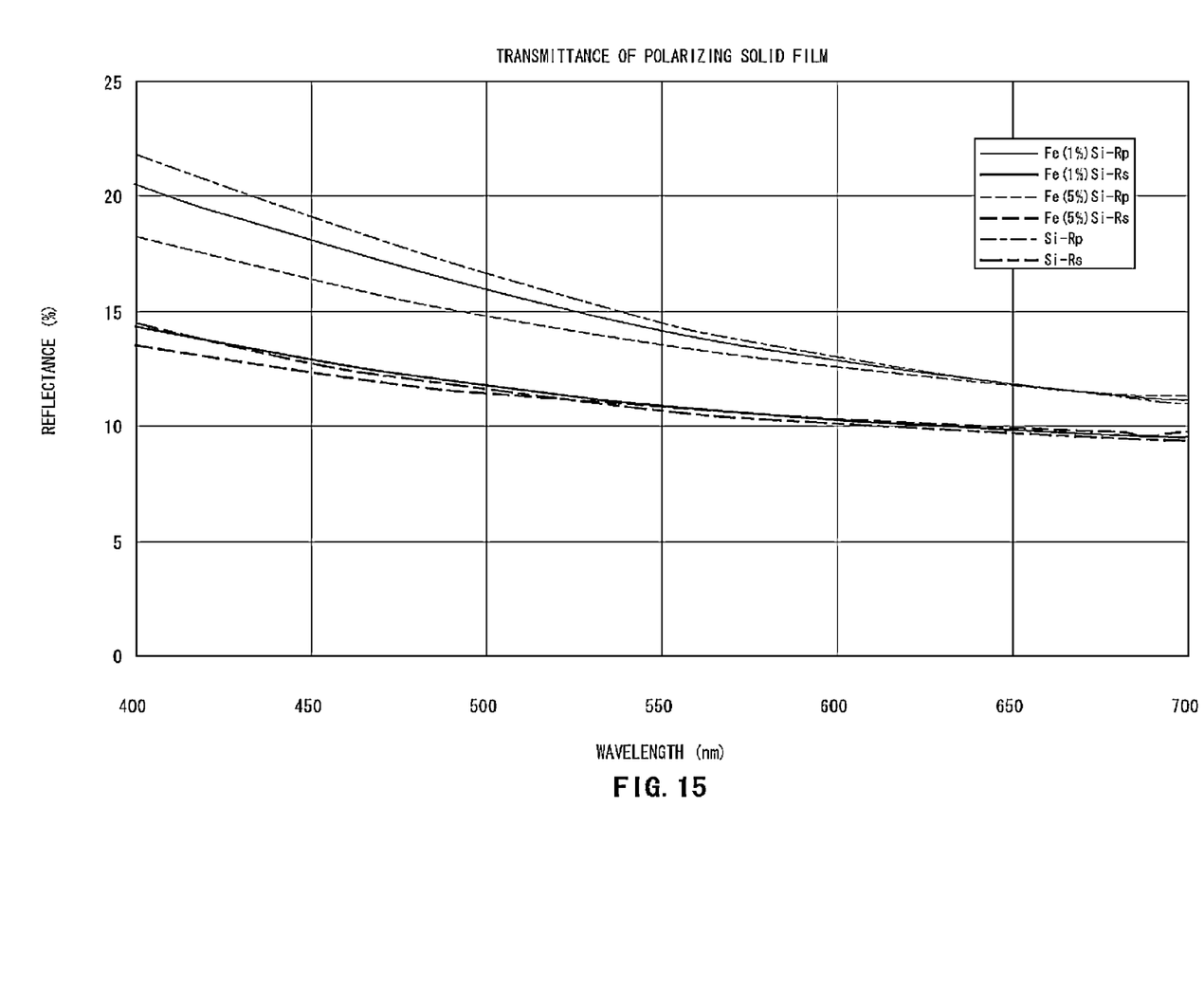
FIG. 15 is a graph showing the results of measurements of a reflectance within measured wavelengths of 400 to 700 nm carried out on samples relating to reference examples 1 to 3.

With respect to these samples relating to reference examples 1 to 3, FIG. 14 shows the results of measurements of a reflectance and a transmittance within measured wavelengths from 400 to 700 nm. Moreover, with respect to the samples relating to reference examples 1 to 3, FIG. 15 shows the results of measurements of a reflectance within measured wavelengths from 400 to 700 nm in an enlarged manner. Furthermore, with respect to the samples relating to reference examples 1 to 3, FIG. 16 shows averages of the reflectance and transmittance within measured wavelengths of 400 to 700 nm of respective bandwidths, that is, BLUE bandwidth (430 to 510 nm), GREEN bandwidth (520 to 590 nm) and RED bandwidth (600 to 680 nm).

Figure 16:
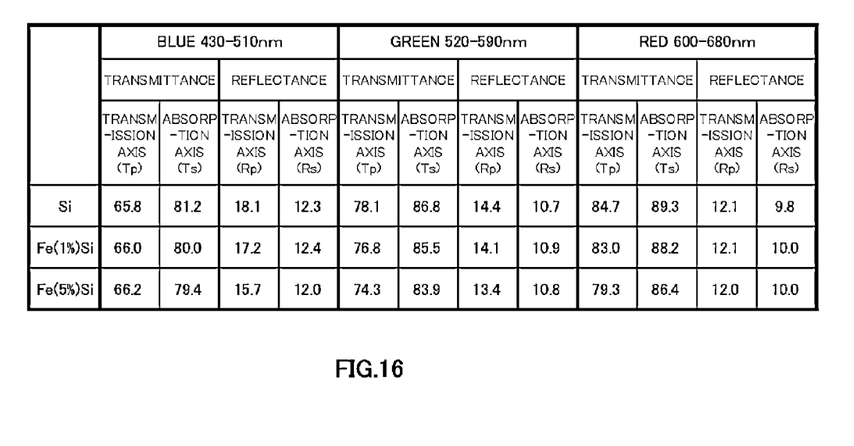
FIG. 16 is a table showing averages of the reflectance and transmittance within measured wavelengths of 400 to 700 nm of respective bandwidths, that is, BLUE bandwidth (430 to 510 nm), GREEN bandwidth (520 to 590 nm) and RED bandwidth (600 to 680 nm) with respect to samples relating to reference examples 1 to 3.

As shown in FIGS. 14 to 16, it is found that in comparison with the Si fine particle film, by forming a film of FeSi fine particles with Fe being added thereto, the reflectance is reduced from the BLUE bandwidth to the GREEN bandwidth (about 400 to 600 nm). In particular, in the sample on which a Fe(5%) Si fine particle film was formed, both of the transmittance axis reflectance and absorption axis reflectance were reduced in the BLUE bandwidth (430 to 510 nm). Moreover, in the sample on which a Fe(5%) Si fine particle film was formed, the transmission axis transmittance (Tp) was superior in the short wavelength range (BLUE bandwidth: 400 to 470 nm).

Based upon the above-mentioned facts, by adopting the Fe(5%) Si fine particle film as the absorbing film of the absorption type polarizing plate, it is possible to more effectively absorb reflection from the BLUE bandwidth to the GREEN bandwidth (about 400 to 600 nm) in comparison with the Si fine particle film so that both of the transmission axis reflectance and the absorption axis reflectance can be further reduced. That is, the basic characteristics of absorption type polarizing plate characteristics can be improved.

Moreover, by adopting the Fe(5%) Si fine particle film as the absorbing film of the absorption type polarizing plate, it is possible to improve the transmission axis transmittance (Tp) in the BLUE bandwidth (430 to 510 nm) in comparison with the Si fine particle film. That is, the Fe(5%) Si fine particle film exerts a good transmittance characteristic as a polarizing plate, and by adopting this as the absorbing film of a high transmittance polarizing plate, it becomes possible to improve the characteristics of the absorption type polarizing plate.

As described above, by adopting the FeSi fine particles as inorganic fine particles forming the absorbing layer, the absorption axis reflectance can be reduced over a wide range of wavelength bandwidths, while the same transmittance and contrast as those of an inorganic polarizing plate with the absorbing layer composed of Si fine particles being maintained. In particular, as shown in FIG. 9, by setting Fe in the composition ratio of the FeSi fine particles to 1 to 5 mol %, the absorption axis reflectance can be reduced over a wider range of wavelength bandwidths as shown in FIG. 5, while the same transmittance and contrast as those of an inorganic polarizing plate with the absorbing layer composed of Si fine particles being maintained.

In other words, in accordance with the present invention, since the reflectance can be reduced over a wider range of wavelength bandwidths, it is possible to provide a polarizing plate having a desired extinction ratio over a wide range of the visible light region. Therefore, even in the case when the wavelength bandwidth to be used is different, the organic polarizing plate in accordance with the present invention is applicable to such a structure, and an inorganic polarizing plate can be manufactured under common manufacturing conditions.

Moreover, light reflected by a polarizing plate is converted into heat to give influences to reliability of other devices forming a liquid crystal projector; however, the present invention makes it possible to further reduce the reflectance so that it is advantageously applied not only to a polarizing plate, but also to a liquid crystal projector itself.

Furthermore, the present invention makes it possible to ensure durability equivalent to that of Si that has been conventionally used, and consequently to address the need for an inorganic polarizing plate that is superior in durability to be used as a liquid crystal projector. In particular, in the organic polarizing plate, since the organic molecules are deteriorated at a short wavelength range (BLUE bandwidth: 400 to 470 nm), failing to obtain sufficient durability, and in a GREEN bandwidth (about 400 to 600 nm) also, a problem is raised in that an insufficient resistance is caused due to thermal degradation because of high energy. In contrast, the inorganic polarizing plate of the present invention is superior in durability and is also allowed to exert good characteristics as the absorbing type polarizing plate, when Fe is added to Si as described earlier.

What is claimed is:

1. An inorganic polarizing plate comprising:
   a substrate that is transparent to light in a used bandwidth;
   a reflective layer that is composed of grids that are formed on one surface of the substrate with a pitch that is smaller than a wavelength of light in the used bandwidth;
   a dielectric layer that is stacked on the reflective layer; and
   an absorbing layer containing FeSi fine particles that is stacked on the dielectric layer;
   wherein an amount of Fe in the FeSi is in a range of from 1 mol % to 5 mol %.

2. The inorganic polarizing plate according to claim 1, wherein light in the used bandwidth has a wavelength in a range from 400 to 510 nm.

3. The inorganic polarizing plate according to claim 1, wherein the absorbing layer is composed of a plurality of layers of silicide-based semiconductor fine particles that are stacked one after another.

4. The inorganic polarizing plate according to claim 1, wherein the absorbing layer is formed by an oblique film-forming process.

5. The inorganic polarizing plate according to claim 1, wherein the absorbing layer is formed by stacking a single layer or a plurality of layers on one side or two sides of a grid upper portion of the reflective layer.

6. The inorganic polarizing plate according to claim 1, wherein a protective layer is stacked on the uppermost portion of the absorbing layer.

* * * * *